United States Patent [19]
Witt

[11] 4,231,147
[45] Nov. 4, 1980

[54] METHODS AND APPARATUS FOR INSTALLING CLUTCHES IN AUTOMATIC TRANSMISSIONS

[76] Inventor: David Witt, 1731 Marian Dr., Norman, Okla. 73069

[21] Appl. No.: 964,878

[22] Filed: Nov. 30, 1978

[51] Int. Cl.³ .................................... B23P 19/04
[52] U.S. Cl. ............................ 29/433; 29/241; 29/274; 29/464; 29/469; 251/209; 269/40
[58] Field of Search ............ 29/464, 469, 433, 467, 29/468, 241, 274; 251/209; 269/40

[56] References Cited

U.S. PATENT DOCUMENTS

| 383,356 | 5/1888 | Hawkridge | 251/209 |
| 1,493,133 | 5/1924 | Sykora | 251/209 X |
| 2,044,818 | 6/1936 | Spase | 29/274 |
| 3,681,191 | 8/1972 | Farrelly | 251/209 X |
| 3,686,739 | 8/1972 | Manero | 29/274 |

Primary Examiner—Charlie T. Moon
Attorney, Agent, or Firm—Laney, Dougherty, Hessin & Beavers

[57] ABSTRACT

The present invention provides methods and apparatus for installing a cylindrical body, having a plurality of external axial splines, within a stack of annular plates, said plates having radially inner teeth for meshing with said splines. The method includes the placement of a cylindrical alignment tool, having a plurality of external splines, in a position subsequently to be occupied by said cylindrical body. The annular plates are placed about said alignment tool, with the teeth of said annular plates meshing with said alignment tool. Then, an axially compressive force is applied to said stack of plates to maintain axial alignment of the teeth of adjacent plates. This axial compressive force is supplied by a high pressure fluid which is communicated to a piston engaging said stack of plates. Then, the alignment tool is removed while said axial compressive force is retained on said stack of plates. Finally, said cylindrical body is inserted into the stack of plates, while the axial compressive force is still being applied, thereby holding the radially inner teeth of the annular plate in axial alignment.

5 Claims, 11 Drawing Figures

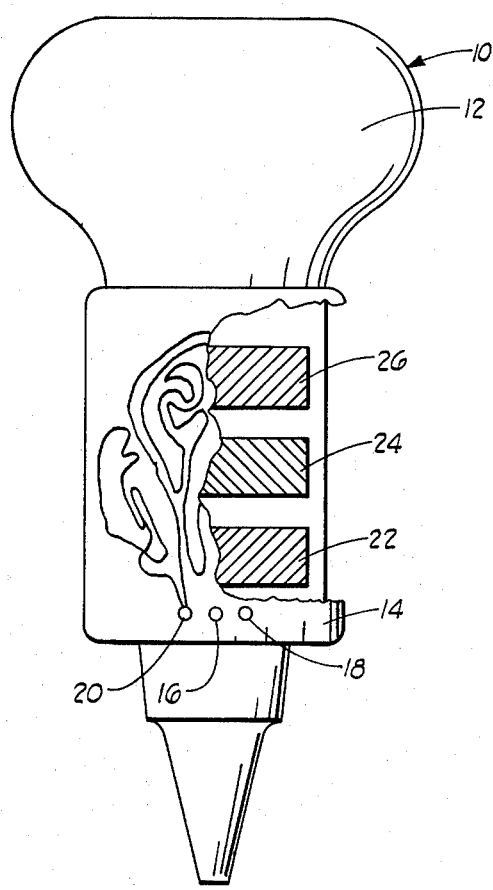
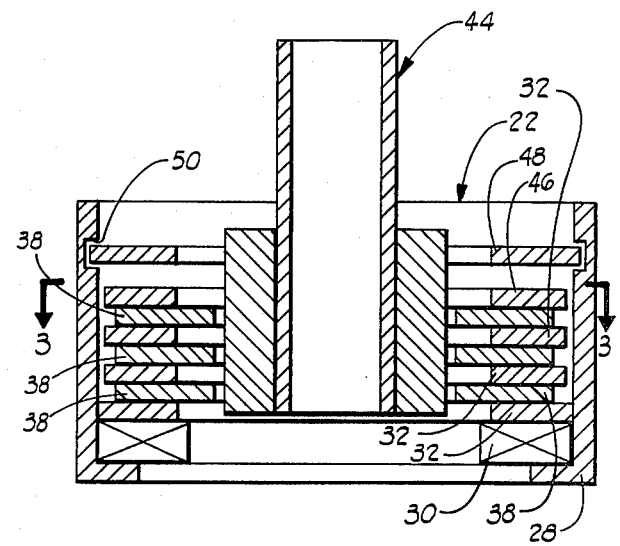
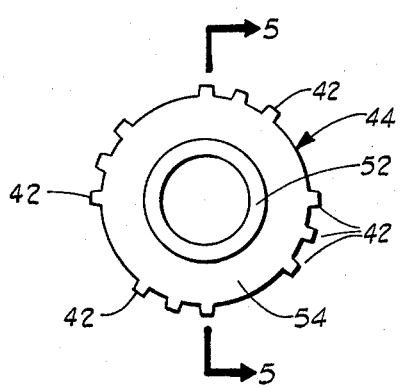
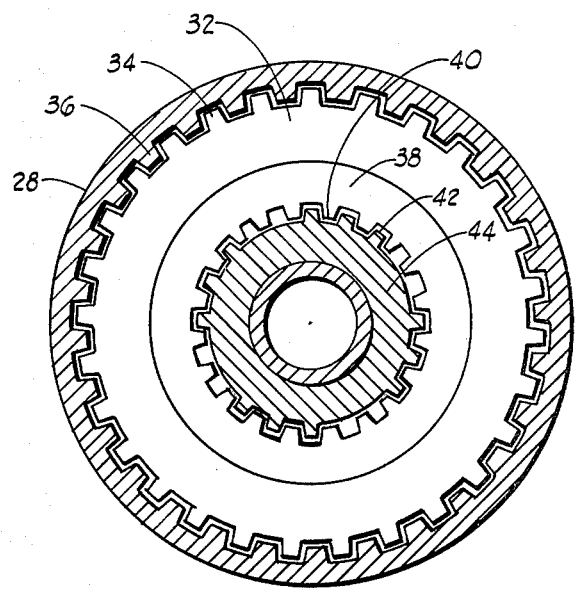

METHODS AND APPARATUS FOR INSTALLING CLUTCHES IN AUTOMATIC TRANSMISSIONS

BACKGROUND OF THE INVENTION

1. Field of the Invention

This invention relates generally to installation of clutch assemblies in automatic transmissions, and more particularly, but not by way of limitation, to apparatus and methods for the installation of clutch assemblies in General Motors Type 400 and Type 350 Turbo Hydra-Matic transmissions.

2. Description of the Prior Art

Automatic transmissions typically used in modern automobiles generally include several clutch assemblies which are interconnected with each other by means of splined connections. The clutch assemblies are actuated in various combinations in order to produce the desired output motion from the transmission.

Each clutch assembly typically includes a clutch casing having a cylindrical cavity therein. In that cavity there is located a stack of annular clutch plates. The stack of clutch plates is comprised of alternating steel plates and friction plates. The steel plates have a plurality of radial outer teeth which engage or mesh with radially inner axial splines of the clutch casing. The friction plates have a plurality of radially inner teeth for engagement with an externally axial splined cylindrical body of another clutch assembly or of another part of the transmission to which power must be transmitted. Also, disposed in the cylindrical cavity of the clutch casing is an annular piston which acts to exert an axial compressive force on the stack of clutch plates when fluid under pressure is supplied to the piston.

This invention concerns the difficulty which has long been experienced in inserting the externally splined cylindrical body into engagement with the radially inner teeth of the friction plates of the clutch assembly. Preferably, in order to slip the cylindrical body smoothly into engagement with one single axial motion, the teeth of the several friction plates must be axially aligned so as to fit between the axial splines of the cylindrical body.

Unfortunately, this is very difficult to accomplish with the methods of the prior art. The methods of assembly of the prior art require that the cylindrical body be inserted into engagement with the friction plates while those friction plates are free to rotate relative to one another. This is because there has previously been no means for supplying an axial compressive force to the clutch plates while the cylindrical body was being inserted, so as to keep the inner teeth of the clutch plates in axial alignment.

This problem is compounded when inserting the cylindrical body into a clutch assembly which is already installed in a transmission housing, because the cylindrical body typically includes other structures which make it impossible to see the clutch plates as the cylindrical body is being inserted. This requires that the assembly be made by feel, and typically involves the jiggling back and forth of the cylindrical body with a reversing radial motion so that the cylindrical body is gradually worked into the stack of clutch plates by engaging the splines of the body successively with the radially inner teeth of one friction plate, then the next friction plate and so on.

This problem is of particular significance on the assembly lines of automotive construction plants where great numbers of these clutch assemblies are installed daily.

The methods and apparatus of the present invention overcome the difficulties described above in the installation of clutch assemblies within automatic transmissions. This is done by the use of a cylindrical alignment tool and a means for supplying fluid under pressure to the piston of the clutch assembly. It is estimated that these tools can typically reduce assembly time of a transmission by one hour.

The alignment tool is a cylindrical alignment tool having a plurality of axial splines constructed for engagement with the radially inner teeth of the friction plates of the clutch assembly. The cylindrical alignment tool and the clutch plates are installed within the clutch housing. This may either by done by first positioning the alignment tool and then placing the clutch plates about the alignment tool, or the clutch plates may first be stacked within the clutch housing and then the alignment tool may be inserted therein. It will be noted, however, that the installation of the alignment tool within a stack of clutch plates is much easier than the installation of a typical cylindrical body that must be installed in the transmission, because the alignment tool is relatively small and lightweight and there is no obstructing structure which prevents visual observation of the alignment tool as it is being inserted in the clutch plates.

After the alignment tool and clutch plates are installed within the clutch casing, a high pressure fluid is directed to the piston of the clutch assembly so that the piston applies an axial compressive force on the clutch assembly to retain the radially inner teeth of the friction plates in axial alignment. Then the cylindrical alignment tool is removed from the clutch assembly while the high pressure fluid is still being supplied to the piston. The piston retains the radially inner teeth of the friction plate in axial alignment even after the alignment tool is removed.

Then, the cylindrical body of the next clutch assembly, or the next component of the transmission which must engage the first clutch assembly, is inserted within the stack of clutch plates with a single axial sliding motion. This is possible because the radially inner teeth of the friction plates are held in axial alignment by the high pressure fluid directed to the piston of the clutch assembly.

SUMMARY OF THE INVENTION

The present invention provides methods and apparatus for installing a cylindrical body, having a plurality of external axial splines, within a stack of annular plates, said plates having radially inner teeth for meshing with said splines. The method includes the placement of a cylindrical alignment tool, having a plurality of external splines, in a position subsequently to be occupied by said cylindrical body. The annular plates are placed about said alignment tool, with the teeth of said annular plates meshing with said alignment tool. Then, an axially compressive force is applied to said stack of plates to maintain axial alignment of the teeth of adjacent plates. This axial compressive force is supplied by a high pressure fluid which is communicated to a piston engaging said stack of plates. Then, the alignment tool is removed while said axial compressive force is retained on said stack of plates. Finally, said cylindrical body is inserted into the stack of plates, while the axial compressive force is still being applied, thereby holding the radially inner teeth of the annular plate in axial alignment.

It is, therefore, an object of the present invention to provide an improved method of installation of clutch assemblies in automatic transmissions.

Another object of the present invention is the provision of apparatus for the installation of clutch assemblies in automatic transmissions.

Yet another object of the present invention is the provision of faster methods of installing clutch assemblies in automatic transmissions, than have previously been available, so that the time and expense required for such assembly is decreased.

Other and further objects, features and advantages of the present invention will be readily apparent to those skilled in the art upon a reading of the description of the preferred embodiments which follows, when taken in conjunction with the drawings.

BRIEF DESCRIPTION OF THE DRAWINGS

FIG. 1 is a bottom, partially schematic view of an automatic transmission.

FIG. 2 is an axial sectional view of a clutch assembly, with an alignment tool in place therein.

FIG. 3 is a sectional view of the clutch of FIG. 2 taken along lines 3—3.

FIG. 4 is an end view of a first cylindrical alignment tool for use with a General Motors Type 400 Turbo Hydra-Matic transmission.

Detailed Description of the Preferred Embodiments

Figure 5:
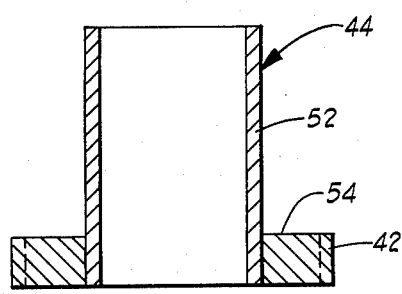
FIG. 5 is a sectional view of the alignment tool of FIG. 4 taken along lines 5—5.

Referring now to the drawings and particularly to FIG. 1, an automatic transmission is shown and generally designated by the numeral 10. Automatic transmission 10 includes a transmission housing 12 and a valve body 14. The valve body 14 is shown with its lower cover removed so that the various orifices and connecting ports of the valve body are illustrated. Particularly first, second and third orificies 16, 18 and 20 are illustrated in a schematic form.

Although the present invention is applicable to most all modern automatic transmissions, the specific embodiments disclosed herein have been particularly designed for use with certain transmissions manufactured by the General Motors Corporation. More specifically, two embodiments disclosed herein have been designed for use with what are commonly referred to as General Motors Type 400 and Type 350 Turbo Hydra-Matic transmissions. The "Type 400" designation is used to refer to a group of General Motors transmissions having a similar design, namely those transmissions which are specifically designated as 425, 400 or 375 Turbo Hydra-Matic transmissions. Similarly, the "Type 350" designation refers to any of those General Motors transmissions designated as 350, 350B or 250 Turbo Hydra-Matic transmissions. These numerical designations and the term Turbo Hydra-Matic are trademarks of the General Motors Corporation. The terms, Type 400 and Type 350, are used in this disclosure to refer generally to all those General Motors transmissions of similar design, as just described.

The transmission 10 of FIG. 1 is a General Motors Type 400 Turbo Hydra-Matic transmission.

First orifice 16 is commonly referred to as the center support hole orifice. Second orifice 18 is generally referred to as the direct clutch apply orifice and third orifice 20 is generally referred to as the direct clutch release orifice.

A portion of valve body 14 is cut away to reveal the internal components of transmission 10 which are shown in a schematic form. Illustrated below valve body 14 are first, second and third clutch assemblies 22, 24 and 26. These clutch assemblies are illustrated in the schematic form, but they are drivingly connected as will be further described below.

In a General Motors Type 400 Turbo Hydra-Matic transmission, first clutch assembly 22 is referred to as the intermediate clutch, second clutch assembly 24 is referred to as the direct clutch, and third clutch assembly 26 is referred to as the forward clutch.

The details of construction of the various types of automatic transmissions and of their clutch assemblies are well known to those skilled in the art and are illustrated in numerous technical manuals and the like. These transmissions have been illustrated and described herein in a rather schematic manner. The details of construction of those transmissions are shown, for example, in Crouse and Anglin, *Automotive Transmissions and Power Trains,* Fifth Edition (1976), published by McGraw-Hill Book Company, which is hereby incorporated herein by reference.

Referring now to FIG. 2, the details of construction of intermediate clutch 22 are more clearly shown. Intermediate clutch 22 includes a clutch casing 28. Located within clutch casing 28 is an annular intermediate clutch piston 30. Located above clutch piston 30 is a first intermediate steel plate 32. Intermediate steel plate 32 is an annular ring having a plurality of radially outer teeth 34 which engage axial radially inner splines 36 of casing 28. This relationship is best seen in FIG. 3. On top of steel plate 32 is a friction plate 38. Friction plate 38 is an annular ring, having a smaller external diameter than steel plate 32 and having a plurality of radially inner teeth 40 for engagement with axial splines 42 of a first alignment tool 44 or other cylindrical body having external axial splines.

Intermediate clutch assembly 22 includes three steel plates 32 which are alternatingly stacked with three friction plates 38. Located above the uppermost friction plate 38, as seen in FIG. 2, is a pressure plate 46. Located above pressure plate 46 is a snap ring 48 which fits within annular groove 50 of the radial inner surface of casing 28.

Each of the friction plates 38 has upper and lower annular friction surfaces bonded thereto for engagement with the steel plates 32 on either side of the friction plates 38.

In order to transmit rotating motion from the casing 28 of clutch assembly 22 to an axially splined cylindrical body in place of the alignment tool 44, it is necessary to apply an axially compressive force across the stack of steel plates 32 and friction plates 38 so as to force the friction surfaces of friction plates 38 into close engagement with the steel plates 32 so that frictional forces generated therebetween will transmit the rotating motion of the casing 28 to the cylindrical body in the place of alignment tool 44.

Referring now to FIGS. 4 and 5, the first alignment tool 44 is shown in more detail. Alignment tool 44 includes an inner cylindrical portion 52 constructed for close engagement with a center support (not shown) of an axial shaft (not shown) of transmission 10 as will be understood by those skilled in the art. Attached to the bottom of inner cylindrical member 52 is an annular disk portion 54 having a plurality of radially outer axial splines 42, as previously described.

Figure 10:
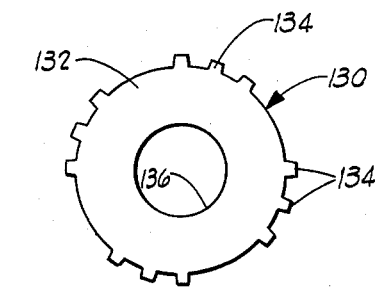
FIG. 10 is an end view of an alignment tool for use with a General Motors Type 350 Turbo Hydra-Matic transmission.

Although the cylindrical body of the automatic transmission 10, which will be substituted in place of the alignment tool 44, typically includes a continuous series of axial splines all the way around an outer surface of the body, it is not necessary to have that many axial splines on the alignment tool itself. Preferably, for economic construction, the alignment tool 44 will include four sets of three axial splines, said sets being located 90° apart as illustrated in FIG. 4. A similar construction will be used in the other alignment tools of the present invention as seen in FIGS. 6 and 10.

Figure 6:
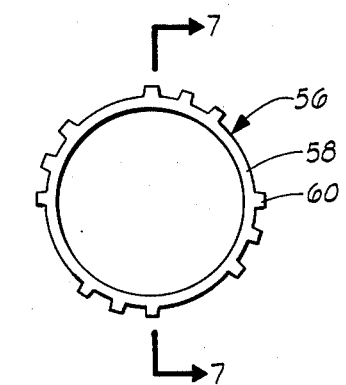
FIG. 6 is an end view of a second cylindrical alignment tool for use with a General Motors Type 400 Turbo Hydra-Matic transmission.
Figure 7:
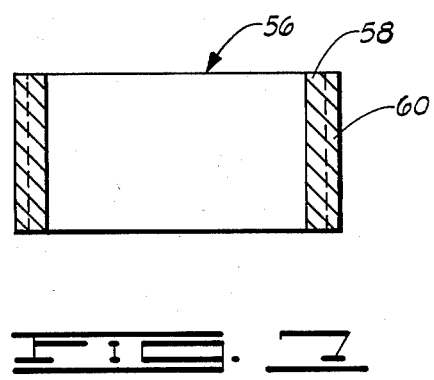
FIG. 7 is a sectional view of the alignment tool of FIG. 6 taken along lines 7—7.

Referring now to FIGS. 6 and 7, a second alignment tool 56 for use with a General Motors Type 400 Turbo Hydra-Matic transmission is shown. Second alignment tool 56 is constructed for insertion within the clutch plates of direct clutch assembly 24. Alignment tool 56 includes a cylindrical portion 58 having a plurality of radially outer splines 60.

Figure 8:
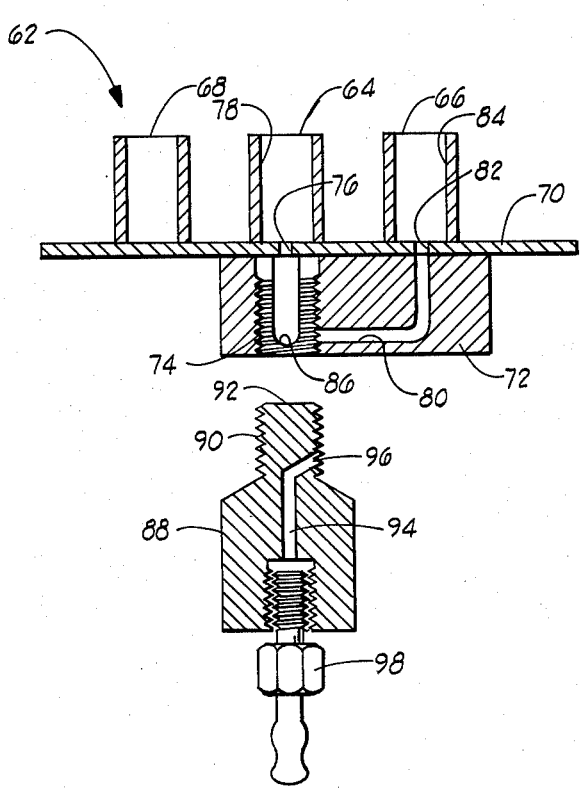
FIG. 8 is a sectional, partially exploded view of a valve means for connection with the orifices of a valve body of the automatic transmission of FIG. 1.

Referring now to FIG. 8, a sectional partially exploded view of a valve means, generally designated by the numeral 62, for use in directing fluid under pressure to the pistons of intermediate and direct clutch assemblies 22 and 24, is shown. Valve means 62 includes first, second and third outlet nozzles 64, 66 and 68. The outlet nozzles 64, 66 and 68 are constructed for engagement with first, second and third orifices 16, 18 and 20, respectively, of valve body 14 of FIG. 1.

Nozzles 64, 66 and 68 are connected to valve plate 70. Connected to the other side of valve plate 70 is valve casing 72. Casing 72 has a threaded bore 74 disposed therein. A first orifice 76 is drilled through valve plate 70 to communicate an inner cavity 78 of first nozzle 64 with threaded bore 74.

A port 80 and second orifice 82 communicate threaded bore 74 with an inner cavity 84 of second nozzle 66.

Threaded bore 74 includes an axial groove 86 which has an open end adjacent plate 70.

Valve means 62 includes a threaded plug 88 having a threaded portion 90 for engagement with threaded bore 74. When plug 88 is fully inserted in threaded bore 74, there is clearance between an end 92 of threaded portion 90 and plate 70. Plug 88 includes a supply port 94 having an opening 96 in the threaded portion 90 thereof.

When plug 88 is inserted in threaded bore 74, the plug 88 may then be varied between first and second positions, wherein said opening 96 selectively communicates with groove 86 and port 80, respectively.

When valve means 62 is in its first position with opening 96 communicating with groove 86, fluid under pressure is directed through first outlet nozzle 64 to center support hole orifice 16 of valve body 14 which directs the fluid under pressure to piston 30 of intermediate clutch assembly 22. When valve means 62 is in its second position with opening 96 communicating with port 80, fluid under pressure is directed to second outlet nozzle 66 to direct clutch apply orifice 18 of valve body 14 which directs the fluid under pressure to a piston of direct clutch assembly 24.

Third outlet nozzle 68 merely serves to plug off direct clutch release orifice 20 of valve body 14.

Plug 88 includes a compressed air supply connection means 98 for connecting the valve 62 with a typical compressed air supply.

Figure 9:
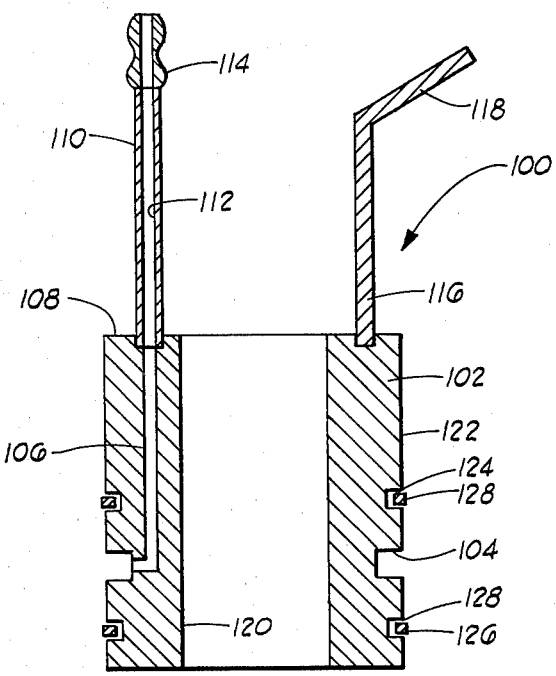
FIG. 9 is an axial sectional view of a high pressure fluid direction tool for use with a General Motors Type 350 Turbo Hydra-Matic transmission.
Figure 11:
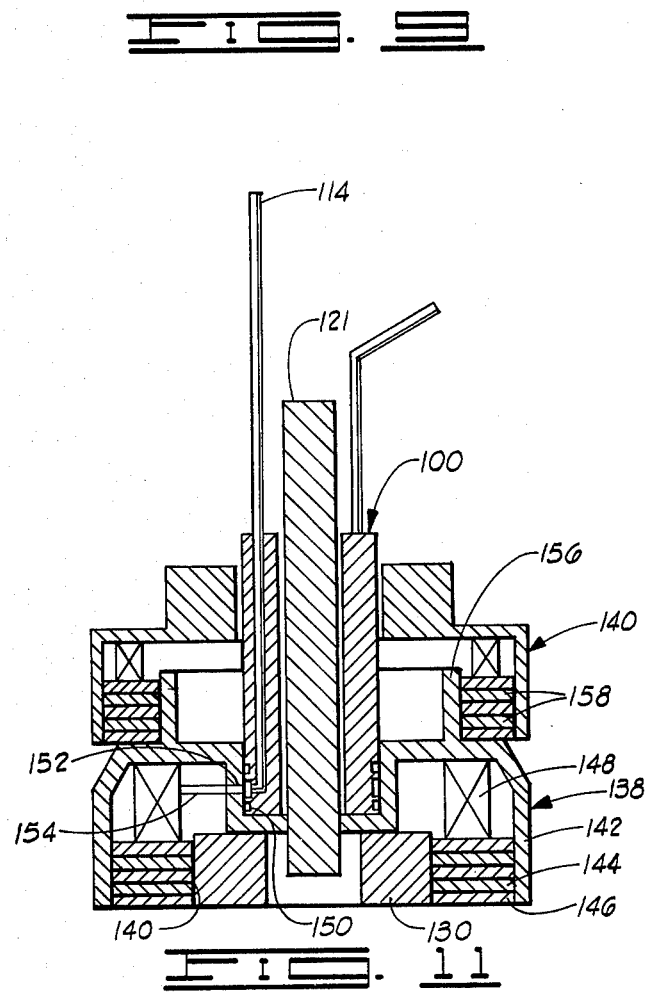
FIG. 11 shows an axial sectional view of the alignment tool of FIG. 10 and the fluid direction tool of FIG. 9 assembled with the direct and forward clutch drums of a General Motors Type 350 Turbo Hydra-Matic transmission.

Referring now to FIGS. 9 through 11, an apparatus for use with a General Motors Type 350 Turbo Hydra-Matic transmission is shown. FIG. 9 is an axial sectional view of a fluid direction tool 100. Direction tool 100 includes a cylindrical body 102 having an annular supply orifice or groove 104 disposed in its outer cylindrical surface. A port 106 axially disposed in a wall of cylindrical body 102 communicates supply groove 104 with an upper end 108 of body 102. Received within upper end 108 of body 102 is a hollow first tool handle 110 which has inner bore 112 communicating with port 106. An upper end of handle 110 includes a compressed air connection means 114.

Cylindrical body 102 also has attached thereto a second tool handle 116 located 180° around cylindrical body 102 from first handle 110. Second handle 116 includes a bent portion 118 which allows the tool 100 to be easily grasped by wrapping one's hand around both handles 110 and 116. Cylindrical body 102 has disposed therethrough an axial bore 120 which fits over an axial shaft 121 of the transmission.

Cylindrical body 102 also has disposed around its radially outer surface 122 upper and lower annular seal grooves 124 and 126, which are located above and below annular supply groove 104. Seals 128 are disposed in grooves 124 and 126. The seals 128 are preferably metal ring seals such as are used in the center support assembly (not shown) of the automatic transmission, as will be understood by those skilled in the art.

FIG. 10 shows an alignment tool 130 for use with a General Motors Type 350 Turbo Hydra-Matic transmission. Alignment tool 130 consists of an annular doughnut-shaped body 132 with a plurality of axial radially outer splines 134. Alignment tool 130 has a concentric axial bore 136 therethrough.

Each different type of automatic transmission has a somewhat varied arrangement of clutches and it is necessary to vary the structure of the tools disclosed herein for each type of transmission. For example, the General Motors Type 350 Turbo Hydra-Matic transmission has a different arrangement of clutches than does the General Motors Type 400 Turbo Hydra-Matic transmission.

The two clutch assemblies of the Type 350 transmission, with which this disclosure is concerned, are the direct clutch and the forward clutch. The arrangement of these clutches is different than that which was shown for the Type 400 transmission of FIG. 1. In the Type 350 transmission, the forward clutch 138, as illustrated in FIG. 11, is located to the rear of the direct clutch 140. The radially inner teeth 140 of the clutch plates of the first forward clutch 138 are constructed for engagement with an axially splined cylindrical body of the Type 350 transmission, which body is the input ring gear (not shown). The input ring gear is inserted in the position occupied by the alignment tool 130 in FIG. 11.

The forward clutch 138 includes a clutch casing 142 which has a plurality of alternating friction plates 144 and steel plates 146 in a manner similar to that illustrated in FIG. 2. Forward clutch 138 also includes a piston 148 shown in schematic form in FIG. 11.

The steel plates 146 include radially outer teeth which engage radially inner splines of casing 142. The friction plates 144 include radially inner teeth which engage the axial splines 134 of alignment tool 130. These teeth will subsequently engage the axial splines of the input ring gear (not shown).

Casing 138 includes at its upper end an annular cavity 150 having an orifice 152 which communicates with piston 148 to supply fluid under pressure to piston 148 through connecting means 154. The orifice 152 and connecting means 154 are shown only in a schematic form.

Extending axially upward from casing 138 is a cylindrical radial portion 156 of casing 138 having radially outer axial splines. Splined portion 156 is constructed to engage a stack of friction plates 158 of direct clutch assembly 140.

METHODS OF THE PRESENT INVENTION

In general, the method of the present invention may be described as a method for installing a cylindrical body having a plurality of external axial splines, within a stack of annular plates which have radially inner teeth for meshing with the splines of the cylindrical body.

For example, with reference to FIG. 2, it is desired to install a cylindrical splined portion of direct clutch assembly 24 of FIG. 1 into engagement with the friction plates 38 of the intermediate clutch assembly 22.

First, a first cylindrical alignment tool 44, having an outer diameter and an axial spline construction similar to the splined cylindrical portion of direct clutch assembly 24 (not shown), is inserted within the clutch casing 28. The annular plates are placed about the alignment tool with the radially inner teeth of the friction plates 38 meshing with splines 42 of alignment tool 44. It is not particularly important whether the friction plates and steel plates 38 and 32 are first placed within the casing 28 or whether the alignment tool 44 is first placed in the casing 28 since it is relatively easy to place the alignment tool 44 within the friction plates 38 after they are already placed within the casing 28.

After the alignment tool and annular plates are in place within the clutch casing 28, an axial compressive force is applied to the stack of friction plates 38 and steel plates 32 by directing a fluid under pressure to piston 30 which will then expand in an axial direction to compress the plates 38 and 32 together. This compressive force maintains the axial alignment of the radially inner teeth 40 of friction plates 38 for so long as the axial compressive force is maintained. While maintaining that axial compressive force, the alignment tool 44 is removed and the cylindrical portion (not shown) of direct clutch assembly 24 is inserted into the stack of plates.

In the General Motors Type 400 Turbo Hydra-Matic transmission, a similar procedure is then used to install the forward clutch assembly 26 into engagement with the direct clutch assembly 24. A second alignment tool 56, illustrated in FIGS. 6 and 7, is inserted into engagement with the friction plates of direct clutch assembly 24. Then, fluid under pressure is directed to the piston of direct clutch assembly 24 to maintain axial alignment of the teeth of the friction plates thereof, while the second alignment tool is removed and the forward clutch assembly 26 is inserted into engagement with the friction plates of the direct clutch assembly 24.

The step of applying fluid under pressure to the pistons of the intermediate clutch assembly 22 and direct clutch assembly 24 includes the step of directing a fluid under pressure to a center support orifice 16 and a direct clutch apply orifice 18 of valve body 14. This is done by inserting valve assembly 62 into engagement with orifices 16, 18 and 20 so that the first and second outlet nozzles 64 and 66 of valve means 62 are inserted into orifices 16 and 18, respectively, so that first nozzle 64 communicates with center support orifice 16 and second nozzle 66 communicates with direct clutch apply orifice 18.

To apply fluid pressure to the piston of the intermediate clutch assembly 22, the valve means 62 is moved to its first position directing fluid to the first outlet nozzle 64. To apply fluid pressure to the piston of the direct clutch assembly 24, the valve means 62 is moved to its second position communicating fluid under pressure to the second outlet nozzle 66.

The assembly of forward and direct clutch assemblies 138 and 140, and their insertion within a General Motors Type 350 Turbo Hydra-Matic transmission is done as follows. The cylindrical alignment tool 130 is inserted within casing 142 of forward clutch assembly 138. The clutch plates 144 and 146 are placed about tool 130 so that the radially inner teeth 140 of friction plates 144 engage the axial splines 134 of alignment tool 130.

The splined portion 156 of forward clutch assembly 138 is inserted within the clutch plates of direct clutch assembly 140 before the insertion of the clutch assemblies into the transmission.

Then, fluid direction tool 100 is placed over shaft 121 and inserted within the annular cavity 150 of forward clutch assembly 138 so that annular supply groove 104 is aligned with orifice 152, so that fluid under pressure may be supplied to piston 148 through fluid direction tool 100. Then, a source of fluid under pressure is connected to connecting means 114 of direction tool 100 and compressed air is supplied through the tool 100, the orifice 152 and the connecting means 154 to piston 148. Piston 148 then applies an axial compressive force to the stack of clutch plates of forward clutch assembly 138 so that the radially inner teeth 140 of friction plates 144 will be retained in axial alignment.

Then, the alignment tool 130 is removed from forward clutch assembly 138 while the fluid under pressure is still being applied to piston 148. Then, while still applying the fluid under pressure to piston 148, the entire assembly shown in FIG. 11, except for the alignment tool 130 which has been removed, is inserted in the General Motors Type 350 Turbo Hydra-Matic transmission and the cylindrical input ring gear (not shown) is inserted within forward clutch assembly 138 so that axial splines (not shown) of the input ring gear (not shown) are engaged with radially inner teeth 140 of friction plates 144 of forward clutch assembly 138. Then, the fluid under pressure may be disconnected and the fluid direction tool 100 may be removed from the cavity 150 so that the remainder of the transmission components may be installed.

Thus, the methods and apparatus for installing clutch assemblies in automatic transmissions of the present invention are well adapted to carry out the objects and attain the ends and advantages mentioned as well as those inherent therein. While presently preferred embodiments of the invention have been described for the purpose of this disclosure, numerous changes in the construction and arrangement of parts can be made by those skilled in the art, which changes are encompassed within the spirit of this invention as defined in the appended claims.

What is claimed is:

1. A method of installing second and third clutch assemblies in an automatic transmission, said method comprising the steps of:

placing a first cylindrical alignment tool, having a plurality of external splines, within a clutch housing of a first clutch assembly;

placing a plurality of annular clutch plates about said first alignment tool, said plates having radially inner teeth engaging said splines of said first alignment tool;

applying fluid under pressure to a piston of said first clutch assembly to apply an axial compressive force to said plates;

removing said first alignment tool, while said axial compressive force is being applied;

engaging an externally axial splined portion of said second clutch assembly with said plates while said axial compressive force is being applied, said splines of said second clutch assembly engaging said inner teeth of said clutch plates of said first clutch assembly;

placing a second cylindrical alignment tool, having a plurality of external splines, within a plurality of annular clutch plates of said second clutch assembly, said plates having radially inner teeth engaging said splines of said second alignment tool;

applying fluid under pressure to a piston of said second clutch assembly to apply an axial compressive force to said plates of said second clutch assembly;

removing said second alignment tool, while said axial compressive force is being applied to said second clutch assembly plates; and engaging an externally splined portion of said third clutch assembly with said plates of said second clutch assembly, while said axial compressive force is being applied to said second clutch assembly plates, said splines of said third clutch assembly engaging said inner teeth of said clutch plates of said second clutch assembly;

wherein said steps of applying fluid under pressure to pistons of said first and second clutch assemblies comprise the steps of:

inserting a valve, having first and second outlet nozzles, into a valve body of said transmission, said first and second nozzles communicating with a center support orifice and a direct clutch apply orifice, respectively;

moving said valve to a first position directing fluid under pressure to said first outlet nozzle; and moving said valve to a second position directing fluid under pressure to said second outlet nozzle.

2. Method of claim 1, wherein:

said transmission is a General Motors Type 400 Turbo Hydra-Matic transmission, and said first, second and third clutch assemblies are intermediate, direct and forward clutch assemblies, respectively.

3. Apparatus for installing a second clutch assembly in an automatic transmission comprising:

a first cylindrical alignment tool, having a plurality of axial splines for engagement with teeth of a stack of clutch plates of a first clutch assembly of said automatic transmission;

a second cylindrical alignment tool, having a plurality of axial splines for engagment with teeth of a stack of clutch plates of said second clutch assembly; and valve means, variable between a first position for directing fluid under pressure to a piston of said first clutch assembly to apply an axial compressive force to said stack of clutch plates thereof to retain said teeth of said clutch plates of said first clutch assembly in axial alignment when said first alignment tool is removed so that an axially splined cylindrical portion of said second clutch assembly may be inserted in the position previously occupied by said first alignment tool, and a second position for directing fluid under pressure to a piston of said second clutch assembly to retain teeth of said stack of clutch plates of said second clutch assembly in axial alignment after said second alignment tool is removed so that an axially splined cylindrical body may be inserted in the position previously occupied by said second alignment tool.

4. Apparatus of claim 3, wherein:

said valve includes first and second outlet nozzles, for insertion in first and second orifices, respectively, in a valve body of said transmission, said first and second orifices communicating with said pistons of said first and second clutch assemblies, respectively.

5. Apparatus of claim 4, wherein:

said transmission is a General Motors Type 400 Turbo Hydra-Matic transmission;

said first and second clutch assemblies are intermediate and direct clutch assemblies, respectively; and said first and second orifices are a center support orifice and a direct clutch apply orifice, respectively.

* * * * *